March 22, 1932.  W. E. HIGGINBOTTOM  1,850,105
ELECTRICAL CONDENSER
Filed April 29, 1929   3 Sheets-Sheet 1
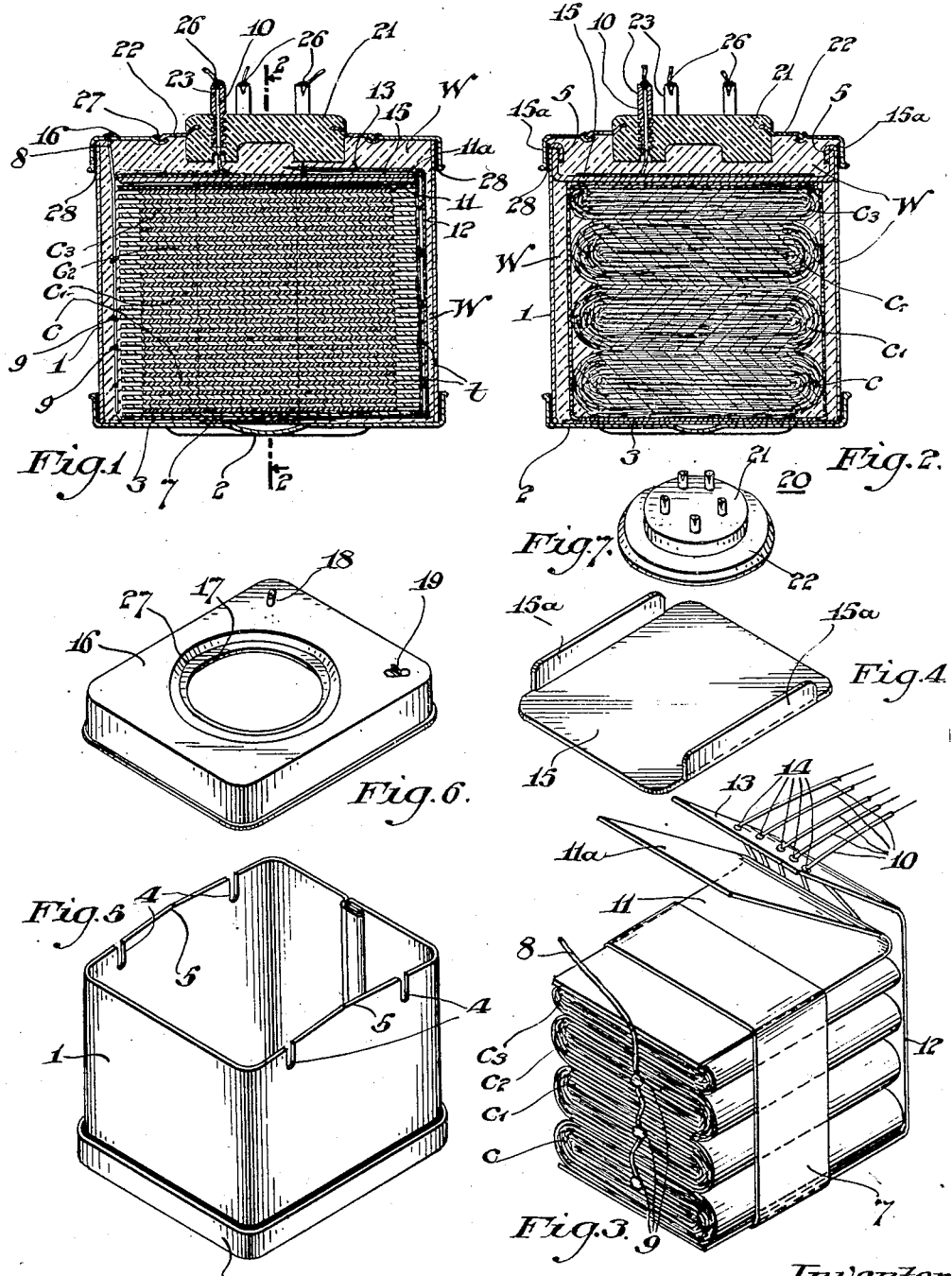

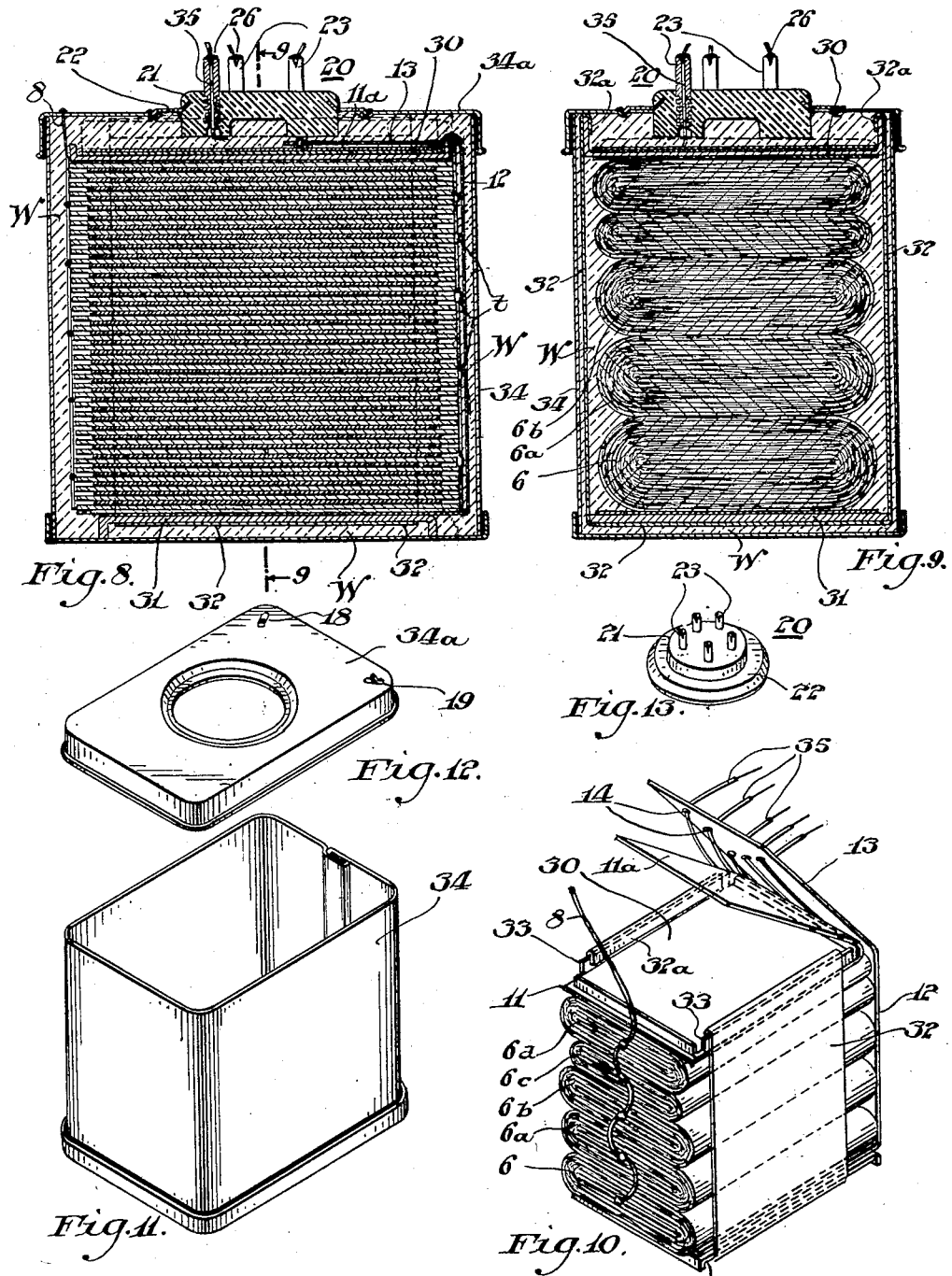

March 22, 1932. W. E. HIGGINBOTTOM 1,850,105
ELECTRICAL CONDENSER
Filed April 29, 1929    3 Sheets-Sheet 3
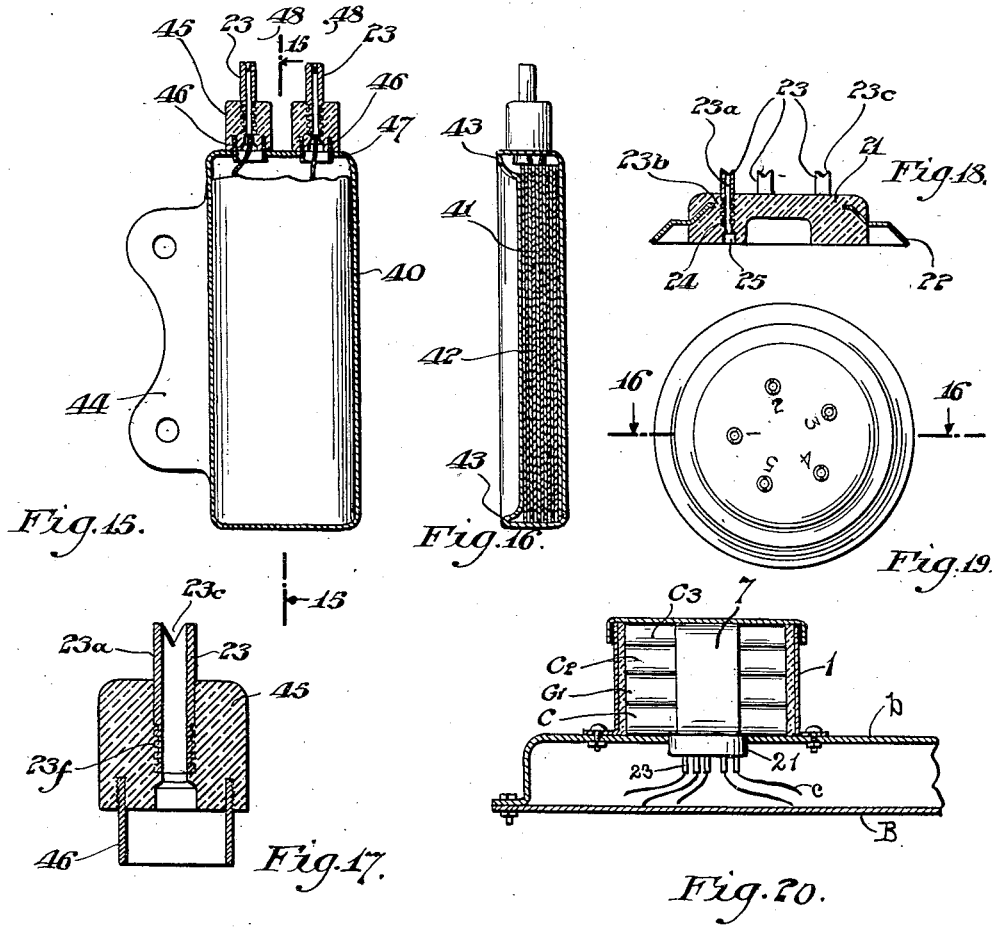
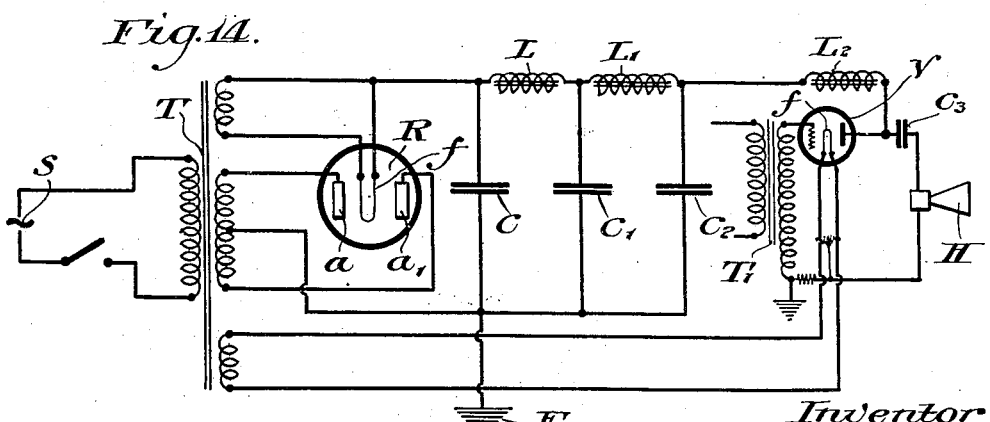
Inventor
William E. Higginbottom
By Cornelius D. Ehret
his Attorney.

Patented Mar. 22, 1932

1,850,105

UNITED STATES PATENT OFFICE

WILLIAM E. HIGGINBOTTOM, OF PHILADELPHIA, PENNSYLVANIA, ASSIGNOR TO ATWATER KENT MANUFACTURING COMPANY, OF PHILADELPHIA, PENNSYLVANIA, A CORPORATION OF PENNSYLVANIA

ELECTRICAL CONDENSER

Application filed April 29, 1929. Serial No. 358,838.

My invention relates to electrical condensers, and more particularly to condensers having a fixed comparatively high capacitance for use in radio receiving apparatus.

In accordance with my invention, condenser structure, as of the multi-unit type, is compressed within the walls of a container, or sub-container, by a bearing or pressure plate upon which the compressive force is exerted; more particularly upper edges or portions of the container or sub-container are bent over and clamped into engagement with corresponding edges of the bearing plate to maintain the same and the condenser structure in their finally compressed positions; and more particularly the lead conductors from the condenser structure are individually brought out to a unit comprising a sealing closure member for the condenser structure, said lead conductors extending through and sealed as by soldering to said closure member.

Further in accordance with my invention, a lead conductor extends through a sealing and insulating terminal unit comprising a cap member or the like of insulating material having molded therein an annular metallic flange member or skirt and a hollow terminal or prong, through which the lead conductor extends; more particularly the metallic flange member or skirt is secured and sealed at its outer periphery, as by soldering or welding, to a metallic container or wall within which apparatus connected to said conductor is disposed; and more particularly the aforesaid lead conductor extending through said insulating member and hollow prong is secured and sealed within the same by a conducting material, as solder, effectively sealing the terminal and electrically connecting said conductor to said prong.

Further and more specifically in accordance with my invention, electrical apparatus as condenser structure or the like, which is to be electrically sealed within a container, is provided with lead conductors of suitable length permitting the same to be mechanically and electrically connected, as by soldering or welding, to the terminals of an insulating closure unit; and more particularly, a cover or closure member having an aperture therein, is sealed, as by soldering or welding, to the container within which apparatus to be sealed is disposed, and the aforesaid insulating closure unit is likewise sealed within said aperture to the cover member to permanently and effectually seal the interior of the container from the atmosphere.

My invention further resides in method and apparatus of the character hereinafter described and claimed.

Electrical apparatus, such as condensers or the like, which of necessity have to be hermetically sealed with respect to the atmosphere to avoid deterioration and ultimate breakdown due to small amounts of moisture coming in contact therewith, have heretofore presented difficulties in sealing due to the fact that lead conductors, or members electrically connected thereto, from the apparatus must extend in both sealing and insulating relation through the walls of the structure enclosing said apparatus. In condenser structure particularly, it is essential that the seal be both effective and permanent, since admission of air containing only small amounts of moisture will eventually cause failure of the condenser. Mechanical clamping means which are relied upon to seal the closure members or apertures through which the lead conductors extend have the disadvantage that they are not integrally formed so as to absolutely prevent air leakage in case of relative deformation, due to temperature changes or for other reasons, between the clamping members.

By my invention, it is possible to permanently and effectively seal the conductor through the wall of the container and at the same time to electrically insulate it with respect thereto. To this end, the lead conductor or conductors are drawn entirely through a terminal unit, the apertures of which are subsequently sealed off by solder or the like, and the terminal unit is integrally united and sealed to said container forming a part of the wall structure thereof.

For a further understanding of my invention, and for an illustration of some of the forms my invention may take, reference is had to the accompanying drawings in which:

Fig. 1 is an elevational cross-sectional view of a condenser unit.

Fig. 2 is an elevational cross-sectional view taken along the line 2—2 of Fig. 1.

Fig. 3 is a perspective view of condenser structure removed from its container.

Fig. 4 illustrates a bearing plate for condenser structure.

Fig. 5 is a perspective view of a container within which condenser structure is disposed.

Fig. 6 is a perspective view of a cover or closure member.

Fig. 7 illustrates an insulating terminal unit.

Fig. 8 is an elevational cross-sectional view of another form of my invention.

Fig. 9 is an elevational cross-sectional view taken along the line 9—9 of Fig. 8.

Fig. 10 is a perspective view of condenser structure removed from its container.

Fig. 11 illustrates a container within which condenser structure shown in Fig. 10 may be disposed.

Fig. 12 is a cover member for the container in Fig. 11.

Fig. 13 is an insulating terminal unit.

Fig. 14 is a diagrammatic illustration of circuit connections for a plurality of condensers grouped together in the same unit and used in radio receiving apparatus.

Fig. 15 is a cross-sectional view of another form of my invention.

Fig. 16 is a cross-sectional view taken along the line 15—15 of Fig. 14.

Fig. 17 is a cross-sectional view of a modified form of terminal unit.

Figs. 18 and 19 are views of an insulating terminal unit.

Fig. 20 is a fragmentary view of mounting structure.

Referring to Figs. 1 to 7 inclusive, a container 1 of suitable material, such as tinned sheet metal, for example, comprises a rectangular structure having a ribbed bottom structure 2 for the purpose of increasing the strength thereof. The bottom 2 is secured and sealed as by soldering, to the wall structure of container 1 and is further reinforced by a flat plate 3. Opposing edges of the upper wall structure are cut away or slotted as at 4 for a purpose hereinafter described, the respective upper edges of the container between slots 4 being preferably raised as at 5, with respect to the adjacent edges.

Condenser structure adapted to be housed within container 1 is illustrated in Fig. 3, wherein a plurality of condensers $C$, $C_1$, $C_2$, and $C_3$ of the well known rolled type comprising thin strips of alternately disposed insulating and conducting materials wound in the form of a roll, are stacked one above the other and temporarily held together by a band 7 of paper or the like. In the present instance, the external plate or foil of condensers $C$, $C_1$, and $C_2$ are at the same or ground potential (Fig. 14), ground connection 8 extending along one side of the condenser structure to afford a common ground connection at 9 to the said condensers. The opposite terminals of the condenser, which are to be connected to apparatus exteriorly of the condenser unit are connected to lead conductors 10 which extend upwardly along the opposite sides of the condensers. By this arrangement, capacity coupling between the circuits comprising the individual condensers is substantially prevented. A member 11 of light but strong cardboard is secured by band 7 to the top of the condenser structure and serves to separate the lead conductors 10 from the condenser proper and from a metallic bearing plate, hereinafter described. A wrapper 12 of similar material is likewise held by band 7 to the bottom of the container structure from where it extends upwardly along the side adjacent to and overlying the lead conductors 10 and partly over the top of member 11. That part of wrapper 12 which extends over the top of the condenser comprises in effect a distributing panel 13 through the apertures 14 of which extend lead conductors 10. Upon insertion of the condenser structure within container 1 it will be apparent that wrapper 12 protects and serves to insulate conductors 10 from the adjacent metallic wall structure of the container, and in addition serves to maintain the lead conductors in their proper relation so that they may be readily connected to terminal structure hereinafter described.

With the condenser structure within container 1, a bearing plate 15 comprising oppositely upturned edges or flanges 15a is disposed between the members 11, and 11a, which comprises an extension thereof. Pressure is brought to bear upon plate 15 and the rolled condensers 6 are compressed downwardly within container 1 to a desired extent, after which those portions of the upper walls of the container between slots 4 are bent inwardly and over the flanges 15a of the bearing plate (Fig. 2) to clamp and maintain the same in its compressed position.

A cover or closure member 16 comprises a flanged aperture 17 centrally thereof and a pair of smaller apertures 18 and 19 for a purpose hereinafter described. An insulating terminal unit 20 adapted to be disposed in registering relation with respect to aperture 17 comprises a plug or cap 21 of insulating material adapted to be molded into different shapes, and a metallic annular flange or skirt 22 molded to member 21. Referring more particularly to Figs. 18 and 19, cap 21 has molded therein a plurality of hollow conductors or terminal prongs 23 closed at their lower ends 24 to prevent the passages 23a within the terminals from filling with the insulating material during the molding process. The lower ends of the terminal prongs are grooved at 23b to permit the insulating material to firmly grip the same. Beneath and in registering relation with each terminal prong is molded a recess 25. After the molding process has been completed, a continuous passage is drilled from recess 25 through the insulating material and closed ends of the terminals to permit a conductor to be led through and connected to the terminal unit in a manner hereinafter described.

In Figs. 1 and 2 there is shown a terminal prong in cross-section and a lead conductor 10 extending therethrough and sealed within the hollow passage of the terminal by a conducting material 26 such as solder, for example. Since during the assembly of the condenser unit, the terminal unit 20 is secured in sealed relation to cover 16 at 27, as by soldering, cover 16 likewise being soldered and sealed to the container 1 at 28, it will be apparent that sealing the lead conductors 10 through their respective terminals completes, except for apertures 18 and 19, hermetic sealing of the condenser structure within the container. The upper ends of the terminals are preferably notched at 23c, so that the loose lead conductors extending through the terminals may be bent over the notches and clipped off prior to the soldering process. In practice, the ends of the terminal prongs having the conductors therein are dipped into solder or the like, which partially fills the passages 23a to effectively seal the conductor within terminal 23 and forms an external bead to electrically and permanently connect the corresponding conductor thereto. With the parts in their above described positions, the common ground conductor 8 which extends through aperture 19 in the cover member is sealed and electrically connected thereto by solder or the like. The condenser unit is subsequently subjected to heat and all air is evacuated therefrom through aperture 18, after which an insulating compound W of suitable characteristics is forced in a hot liquid state under pressure through aperture 18 to impregnate the condenser structure in a manner well known in the art. The aperture 18 is sealed with solder or the like after the condenser has been impregnated.

In Figs. 8 to 13 inclusive is illustrated a condenser unit larger and more rugged in construction than that previously described. In the present instance the individual rolled condensers 6, 6a, etc., (Fig. 10) are compressed between plates 30 and 31, and are held in such position by a metallic strip or sub-container 32 of suitable material, as tinned sheet metal. Extending underneath plate 31, and along opposite sides of the rolled condensers, the upper edges of the sub-container 32 are bent over as at 32a to engage and clamp the upstanding flanges 33 of the bearing plate 30. Accordingly, the walls of the main container 34 do not need to be of such heavy material as would be necessary to maintain the rolled condensers in their compressed position. As in the previous instance, the condenser structure, after it has been inserted within its container, is connected through its lead conductors 35 to a terminal unit 20. Since the remaining details of construction and assembly are similar to those described with reference to Figs. 1 to 7 inclusive, further description is believed to be unnecessary. A practical advantage of the latter modification, however, is that the condenser structure may be suitably compressed independently of its main container and held in such position by a sub-container or equivalent which forms with the rolled condensers a unit adapted to be readily inserted within the main container. The connections are soldered to the respective condenser terminals of the unit after compression of the same and before insertion within the container. Furthermore, the conducting terminal strips $t$ of the condensers, which are usually disposed loosely within the condenser rolls, are firmly clamped in position by the compressed rolls and so tend to remain in normal position during and after the soldering operation.

It shall be further understood that the skirt 22 molded to the insulating cap may comprise the entire cover section, although preferably it is of smaller size due to greater convenience in sealing the conductors within the terminals.

There is shown in Fig. 14 an electrical network, specifically an incomplete circuit diagram of a power filter system for radio receiving apparatus, wherein a source of alternating current S is connected to the primary of a transformer T to supply power to the circuits in question. The secondary windings of transformer T supply current to the respective filaments of a rectifier tube R and a power tube V, as well as current to a filter circuit whose terminals are connected to the double anode $a$ and $a1$, and the filament $f$ of the rectifier tube. The filter circuit comprises inductances L and L1 connected in series, and condensers C, $C_1$ and $C_2$ connected in shunt therewith in the usual manner. Each of the condensers C, $C_1$ and $C_2$ have corresponding terminals connected to a common ground at E and are housed within a single condenser as above described to form a condenser unit. An inductance L2 connected in series with L and L1 is connected to the anode of tube V, to which is also connected condenser $C_3$ in series with the loud speaker unit H. The power tube V is connected through audio transformer T1 in the usual manner to the preceding stages of a receiving circuit.

Referring to Figs. 15 and 16, there is illustrated a single condenser of smaller capacity suitable for use, for example, as the series condenser $C_3$, Fig. 14, comprising a casing 40 having a condenser 41 of any suitable type disposed therein, and a bearing plate 42 forming one side of the condenser container and soldered to the edges thereof at 43 to seal the condenser and maintain it in a compressed position. A mounting flange 44 is secured to container 40. The lead conductors from the condenser are brought out through terminal structure (Fig. 17) similar to that previously described, comprising an insulating plug of moldable material having a terminal prong 23 of the type previously described molded therein at one end, and a metallic collar or sleeve 46 molded in and projecting from the opposite end thereof. The sleeve-like members 46 are disposed within registering apertures in one wall of the container 40 and are secured thereto at their peripheries 47 by solder or the like. Conductors 48 extending through the terminal prongs are sealed and electrically connected thereto in the manner previously described, and the condenser may subsequently be impregnated with an insulating compound in any well known manner.

In Fig. 20, there is shown mounting structure for a condenser unit of the type previously described. The main container 1 is mounted in inverted position upon a sub-base or panel $b$, to which it is secured in any suitable manner as by bolts, rivets, etc. The insulating terminal cap 21 extends through an aperture in panel $b$, the terminals 23 thereof being connected to lead conductors $c$ which are connected to other apparatus. A main base B comprising part of a housing (not shown) is disposed beneath and spaced from panel $b$, forming therewith a compartment for housing the lead conductors.

What I claim is:—

1. A condenser unit comprising a plurality of rolled condensers, a sheet-metal container therefor, a bearing plate exerting pressure on said condensers, means comprising folded portions of said sheet-metal container engaging said bearing plate to hold it in position maintaining said condensers under compression, and a closure member sealing said container independently of said bearing plate.

2. A condenser unit comprising a plurality of rolled condensers, a container therefor, a bearing plate having upwardly extending flanges exerting pressure on said condensers, means comprising upper edges of said container bent inwardly to engage and clamp said bearing plate in position maintaining said condensers under compression, and a closure member sealing said container independently of said bearing plate.

3. A condenser unit comprising a plurality of rolled condensers, a container therefor, lead conductors extending from said condensers, a wrapper disposed between said condensers and a wall of said container to protect said lead conductors, and means comprising a portion of said wrapper forming a distributing panel through which said conductors are guided to corresponding terminal members of said unit.

4. A condenser unit comprising a container, a sheet-metal structure disposed within said container and having walls embracing a rolled condenser, a bearing plate for exerting pressure on said condenser, and means comprising upper wall portions of said structure for engaging said bearing plate to maintain said condensers in compressed position independently of said container.

WILLIAM E. HIGGINBOTTOM.